Patented Aug. 1, 1944

2,354,813

UNITED STATES PATENT OFFICE 2,354,813

PRODUCTION OF CHLORINATED DIPHENYL COMPOUNDS

Russell L. Jenkins, Anniston, Ala., assignor to Monsanto Chemical Company, St. Louis, Mo., a corporation of Delaware No Drawing. Application January 19, 1942, Serial No. 427,295

5 Claims. (Cl. 260—649)

The present invention relates to the production of chlorinated diphenyl compounds such as polychlorodiphenyls by the direct chlorination at elevated temperatures of nitrosubstituted diphenyl compounds, particularly mononitrodiphenyls. The present application is a continuation-in-part of my application, Serial No. 350,121, filed August 2, 1940.

The principal object of the present invention is to provide a process of converting nitro-substituted diphenyl compounds or derivatives thereof to chlorinated diphenyl compounds free from nitro groups. It is a more specific object of the invention to provide a process of directly chlorinating orthonitrodiphenyl to obtain chlorinated diphenyls free of nitro groups. Other objects of the invention will be apparent to those skilled in the art.

In the nitration of diphenyl compounds a mixture of isomers is generally obtained. One isomer is frequently more valuable than the others which may be formed. As a result, nitrodiphenyl compounds, of restricted or limited usefulness, may accumulate. The original diphenyl compound may be more valuable than the nitrodiphenyl compound. Ortho-nitrodiphenyl is such a compound, which, although useful for a number of industrial purposes, is available in greater quantities than can be consumed at present in industry.

In my copending application, of which the present application is a continuation-in-part, I described a method of chlorinating ortho-nitrodiphenyl to obtain highly useful liquid dielectric compositions comprising chlorinated ortho-nitrodiphenyls. I have also disclosed that decomposition will be induced if the chlorination is conducted at too high a temperature.

I have subsequently discovered that if the chlorination is conducted at these somewhat higher temperatures under specified conditions, which will be more fully disclosed herein, that the resulting product will be a chlorinated diphenyl mixture free from all traces of nitrogen and that this same general procedure of eliminating nitro groups by chlorination is applicable to nitro-substituted diphenyl compounds in general. The preferred products of the chlorination of ortho-nitrodiphenyl are polychlorinated diphenyls and the direct chlorination to substitute chlorine in the diphenyl nucleus and split out the nitro group proceeds very smoothly and the elimination of the nitro group is complete, especially when iron or a similar chlorination catalyst is present. The process of this invention, when used for the production of polychlorodiphenyls from orthonitrodiphenyl, is preferably operated in such a manner that the initial or preliminary chlorination produces chlorinated orthonitrodiphenyls of lower chlorine content than is desired and thereafter the chlorination is continued under conditions favoring the splitting out of the nitro group while the additional chlorine is substituted into the diphenyl nucleus.

In chlorinating ortho-nitrodiphenyl according to the preferred process of my invention, to obtain polychlorodiphenyls, the chlorination is conducted in the presence of an iron catalyst. The catalyst may be introduced as anhydrous ferric chloride, ferric oxide or metallic iron, both iron and ferric oxide probably reacting during the chlorination to give iron chlorides that are the effective catalysts. Other catalysts may be used, including antimony chloride, aluminum chloride or its equivalent, aluminum metal, but reaction conditions must be carefully controlled to approximate the specific conditions disclosed herein for the chlorination in the presence of iron or ferric chloride. The specified metal and metal halide catalysts are referred to herein as metal halide chlorination catalysts. The proportion of catalyst to use is exemplified in the description hereinafter. Generally less than 1% of ferric chloride is ample or a system in which the product is chlorinated while passing over a mass of iron metal may be used.

The initial chlorination is conducted at a temperature below about 165° C. until chlorine has been substituted into the ortho-nitrodiphenyl. Generally temperatures between 80° C. and 165° C. are preferred for this initial chlorination. After the initial chlorination is accomplished the temperature is raised to 200° C. or more, whereupon the attack upon the nitro group begins, while at the same time additional chlorine is substituted into the diphenyl nucleus.

The extent to which the chlorination should be conducted before the temperature is raised to induce removal of the nitro group is somewhat variable. Generally more than one chlorine atom should be substituted in the nucleus and preferably three chlorine atoms should be substituted since the nucleus of the molecule is somewhat stabilized while the removal of the nitro group is somewhat facilitated with increasing chlorine content. The choice of the extent of chlorination which should be adopted before raising the reaction mixture to decomposition temperatures will be limited by the content of chlorine desired in the final product. Ample time for further chlorination following the start of the decomposition should be allowed. Thus, when pentachlorodiphenyls are the desired products, I prefer to raise the temperature to initiate removal of the nitro group when the dichlorodiphenyl or trichlorodiphenyl stage is reached so that the decomposition will proceed while two or three molecular equivalents of chlorine are still to be added. When nonachlorodiphenyls or decachlorodiphenyls are the desired product the removal of the nitro group can be initiated at a later stage. When the compound to be chlorinated contains more than one nitro group, it is desirable to initiate the decomposition at a lower stage than with mononitrodiphenyls to allow time for the removal of the nitro groups during chlorination.

The temperature during the removal of the nitro group should be carefully controlled to provide a gentle reaction. If the reaction is allowed to progress too rapidly, complete charring or explosions are likely to result. Chlorination during the removal of the nitro group stabilizes the molecule and prevents total decomposition to carbon and other products, but the chlorination itself is an exothermic reaction and this fact should be taken into account. The temperature is rather critical, but since it is controlled and dependent to a large extent upon the other factors mentioned, it is not possible to state what the temperature for any particular batch should be. However, in general, it should not exceed 350° C. since complete decomposition to carbon may occur if substantial amounts of nitro compounds are present.

The chlorination and removal of the nitro group may most conveniently be conducted as a batch operation. However, the initial chlorination to provide a lower chlorinated ortho-nitrodiphenyl may be conducted according to the various alternatives known to the art, some of which are disclosed in my copending application referred to hereinabove. The lower chlorinated ortho-nitrodiphenyls may then be placed in a suitable apparatus in which further chlorination and removal of the nitro group at temperatures above about 200° C. are conducted. This latter chlorination reaction cannot be readily conducted in the vapor-phase nor is a process in which the reaction is conducted in the presence of an inert solvent suitable. The apparatus and method of chlorination disclosed in my Patent No. 1,892,397, however, is readily adaptable to the particular chlorination reaction.

The chlorinated diphenyls obtained by the process of my invention may be purified by distillation in vacuum or in other conventional manners. The purified chlorinated diphenyls obtained according to this process are free from nitrogen, as determined by tests capable of detecting the presence of 1 part of nitrogen in 100,000 parts of product. A product corresponding to a decachlorodiphenyl, having a chlorine content of 71% prepared from ortho-nitrodiphenyl according to this invention had a crystallizing point of 305° C. When added to a pure decachlorodiphenyl having a chlorine content of 71% that was prepared by direct chlorination of diphenyl, it produced no depression of the crystallizing point.

The behavior of ortho-nitrodiphenyl on chlorination according to this invention was rather remarkable. It is possible, for example, to heat chlorinated ortho-nitrodiphenyls for long periods at temperatures of 200° to 250° C., even in the presence of ferric chloride catalyst. However, when free chlorine is added or the batch is undergoing further direct chlorination at temperatures of about 200° C., removal of the nitro group sets in. It was furthermore noted that this removal is complete and that yields of chlorinated diphenyls entirely free of nitrogen comparable to those obtained by the direct chlorination of diphenyl are obtained. On the other hand, if pure ortho-nitrodiphenyl containing 1% by weight of anhydrous ferric chloride is chlorinated beginning at 165° C. and is then, while continuing the chlorination, rapidly heated to 200° C., charring and decomposition takes place.

Examples of preferred methods of practicing the invention are as follows:

Example 1

Two hundred fifty-two (252) grams of ortho-nitrodiphenyl and 2.5 grams of anhydrous ferric chloride were charged to a glass flask fitted with a stirrer, thermometer and an air-cooled condenser connected to a receiver. After heating the charge to about 138° C. a slow stream of dry chlorine was passed into the mixture. While continuing the heating the temperature was allowed to rise slowly so that about 4 hours 35 minutes after chlorination was started it reached 189° C. The flask at this point was weighed and was found to have increased about 98.5 grams in weight and about 9 grams of distillate had accumulated in the receiver. Brown fumes were visible in the exhaust gases. After 12 hours 45 minutes of chlorination the temperature reached 226° C. and the flask had gained about 149.7 grams in weight and about 61 grams of sublimate had accumulated in the receiver. The sublimate was returned to the reaction vessel and 2.5 grams of additional anhydrous ferric chloride was added. After 17 hours 35 minutes of chlorination the temperature was 264° C. and the flask had gained 243.5 grams in weight and 22 grams of sublimate had accumulated in the receiver. The sublimate was again returned to the reaction vessel and an additional 3 grams of anhydrous ferric chloride was added. After 21 hours and 10 minutes of chlorination the temperature was 302° C., the flask had gained 269 grams in weight and 26 grams of sublimate had accumulated in the receiver. At this point the chlorination and heating were stopped. The melting point of the crude was 292–294° C. and tests indicated that it contained only traces of nitrogen. The combined crude and sublimate weighed 536 grams and 420.5 grams of this material were distilled over 21 grams of calcium hydroxide. The distilled product weighed 328 grams and was free of nitrogen. Its crystallizing point was 305° C. Admixture of this material with pure decachlorodiphenyl prepared by direct chlorination of diphenyl produced no depression of the crystallizing point.

Example 2

Two hundred fifty-three (253) grams of ortho-nitrodiphenyl and 3.0 grams of anhydrous ferric chloride were charged to a vessel fitted with a stirrer, thermometer and an air-cooled condenser connected to a receiver, as in Example 1. The flask was heated and after heating to a temperature of 102° C. a stream of dry chlorine was introduced into the mixture. The temperature was allowed to rise slowly, so that 13 hours 50 minutes after start of chlorination, it had reached 227° C. The flask was weighed and had gained 228.3 grams in weight and 19 grams of sublimate had accumulated in the receiver. The sublimate was returned to the vessel and 3 grams of anhydrous ferric chloride was added to the mixture. After 21 hours 35 minutes of chlorination and gradual heating the temperature had reached 318° C. and the weight had increased 304 grams. The heating and chlorination were stopped at this point. The melting point of the crude was 278–284° C. The crude was removed from the flask and weighed 550 grams. Only slight traces of nitrogen could be detected in the crude product. Distillation of 400 grams of crude over 20 grams of calcium hydroxide yielded 295 grams of a product corresponding to a decachlorodiphenyl with a crystallizing point of 304° C.

The process of my invention is applicable to direct chlorination of nitrodiphenyl compounds to produce chlorinated diphenyl compounds free of nitro groups. The nitrodiphenyl compounds may contain one or more nitro groups and may have other substituents which are not affected by the temperatures of the reaction or the catalyst, if any is used. Thus, it is possible to chlorinate further while eliminating the nitro group from diphenyl compounds substituted by halogen and hydrocarbon radicals such as the isomeric mononitrodiphenyls, dinitrodiphenyls and other polynitrodiphenyls, the isomeric chloronitrodiphenyls and polychloropolynitrodiphenyls, and aryl-substituted nitrodiphenyls. The temperatures at which the final step of the chlorination is accomplished and complete elimination of nitro groups is effected without complete decomposition of the compound to carbon will be somewhat variable but will in general be above about 200° C. and below about 350° C.

Inasmuch as the foregoing description comprises preferred embodiments of my invention, it is to be understood that these are merely exemplary and that changes and modifications may be made therein without departing substantially from the scope of the invention which is defined in the appended claims.

I claim:

1. The process of producing chlorinated diphenyl compounds free of nitro groups from a chlorinated mononitrodiphenyl of lower chlorine content which comprises the direct chlorination of the chlorinated mononitrodiphenyl in the presence of a metal halide chlorination catalyst at a temperature above approximately 200° C. but below approximately 350° C.

2. The process of producing chlorinated diphenyls free of nitro groups from a chlorinated mononitrodiphenyl containing at least 1 but not more than 3 chlorine atoms which comprises the direct chlorination of the chlorinated mononitrodiphenyl in the presence of a metal halide chlorination catalyst at a temperature above approximately 200° C. but below approximately 350° C.

3. The process of producing chlorinated diphenyl hydrocarbons free of nitro groups from nitrodiphenyl hydrocarbons, which comprises the direct chlorination of the nitrodiphenyl hydrocarbon in the presence of a metal halide chlorination catalyst at a temperature below approximately 200° C. to produce a chlorinated nitrodiphenyl and thereafter continuing the chlorination while splitting out the nitro groups of the chlorinated nitrodiphenyl at a temperature above approximately 200° C. but below approximately 350° C.

4. The process of producing a chlorinated diphenyl having a chlorine content corresponding to more than 4 chlorine atoms per molecule from ortho-nitrodiphenyl which comprises the direct chlorination of ortho-nitrodiphenyl at a temperature below approximately 165° C. to produce a chlorinated nitrodiphenyl having a chlorine content corresponding to approximately 2 chlorine atoms per molecule and thereafter continuing the chlorination while splitting out the nitro group at a temperature above approximately 200° C. but below approximately 350° C.

5. The process of producing chlorinated diphenyls free of nitro groups from chlorinated ortho nitrodiphenyl containing at least 1 but not more than 3 chlorine atoms which comprises the direct chlorination of the chlorinated ortho nitrodiphenyl in the presence of a metal halide chlorination catalyst at a temperature above approximately 200° C. but below approximately 350° C.

RUSSELL L. JENKINS.